May 20, 1969  D. CAPLE  3,444,898
RELEASABLE FLUID SEAL FOR CONDUITS
Filed April 3, 1967
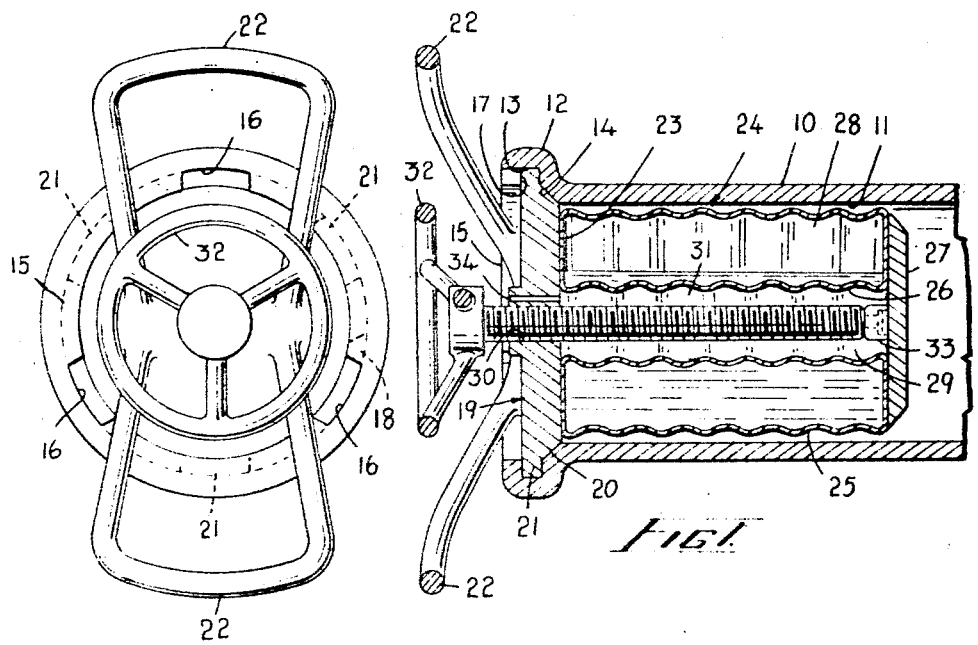
*FIG 1*
*FIG 2*
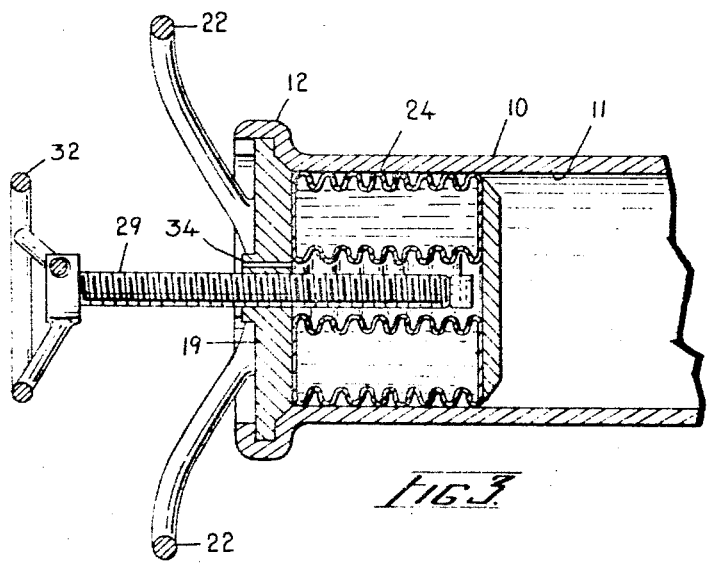
*FIG 3*
INVENTOR
DONALD CAPLE
By *Maybee & Legris*
ATTORNEYS

United States Patent Office 3,444,898
Patented May 20, 1969

3,444,898
RELEASABLE FLUID SEAL FOR CONDUITS
Donald Caple, Downsview, Ontario, Canada, assignor, by mesne assignments, to Orenda Limited, Toronto, Ontario, Canada, a company
Filed Apr. 3, 1967, Ser. No. 627,831
Claims priority, application Great Britain, Apr. 4, 1966, 14,864/66
Int. Cl. F16l 55/12; B65d 39/12; E21b 33/12
U.S. Cl. 138—89                                    4 Claims

ABSTRACT OF THE DISCLOSURE

In a releasable sealing means for a conduit, a bellows unit is attached at one end to the inner face of a closure plug, the bellows unit extending into the bore of the conduit. The bellows unit, which is preferably a double bellows, is partially filled with liquid and is compressed axially by the fluid pressure within the conduit so as to expand radially into sealing engagement with the conduit wall.

Background of the invention

This invention relates to releasable sealing means for conduits and the like carrying fluid under pressure, and particularly to sealing means wherein the sealing force is supplied by the conduit system fluid. Apart from general mechanical and design considerations, it is vitally important that seals of this kind, when used with dangerous fluids such as corrosive or radioactive liquids, should remain wholly reliable during use and that they should be compatible with the particular fluids with which they are used under arduous conditions.

It is the primary object of the present invention to provide releasable sealing means compatible with corrosive, radioactive or otherwise contaminated gases and liquids at elevated pressures and temperatures.

It is another object of the invention to provide sealing means between components wherein the seal must be continually broken and resealed without detriment to the sealing surfaces.

It is a further object of the invention to provide sealing means which may easily be adapted for release and replacement by automated means.

Summary of the invention

A releasable sealing means in accordance with the invention comprises a closure plug, and a sealing member consisting of a bellows unit which is attached at one end of the inner face of the plug. The bellows unit is arranged to extend into the bore of the conduit so that it is subjected to fluid pressure within the conduit and compressed axially thereby, the bellows unit being caused to expand radially into sealing engagement with the wall of the conduit. The bellows is disengaged from the wall of the conduit by means operable exteriorly of the plug for expanding the bellows axially against the fluid pressure.

The bellows unit is preferably a double bellows unit comprising concentric inner and outer bellows members defining a closed annular chamber, an end plate being attached to and closing the inner end of the bellows unit.

Brief description of the drawings

One embodiment of the invention will now be described, by way of example, with reference to the accompanying drawings, in which:

FIGURE 1 is a side elevation, in section, of a conduit end closure plug having sealing means, the sealing means being positioned for removal of the plug from the conduit end;

FIGURE 2 is an end elevation of the conduit end closure plug and sealing means of FIGURE 1; and FIGURE 3 is a view similar to that shown in FIGURE 1, but with the sealing means in fully sealing condition.

Description of the preferred embodiment

Referring to the drawings, a conduit 10, having a bore 11 terminates in a circular end opening having a thick-section, radial flange 12. The flange 12 has an internal circumferential groove 13 and a conical seat 14 formed at the juncture of the bore and the flange. A radial wall 15 partially defining the groove 13 has formed therein three equi-angularly disposed wide slots 16 of the same radial depth as the groove. An inner surface 17 of the wall 15, which forms a side wall of the groove 13, takes the form of three low-pitched helical ramps, each commencing at a slot 16 and terminating at a next adjacent slot in a clockwise direction as viewed in FIGURE 2. A physical stop such as is indicated in phantom at 18 may terminate each ramp.

A disc-shaped closure plug 19 having a conical face 20 is provided with three equi-angularly disposed lugs 21 adapted to enter the slots 16 and the groove 13 of the conduit. The lugs ride up the ramp surfaces in the groove 13, as the plug is turned in a clockwise direction, and the conical face 20 tightly engages the conical seat 14 in the conduit 10 in the well-known manner of closures of the type described. For easy manipulation of the plug 19 two diametrically opposed "spade" grips 22 are formed thereon.

Attached to the inner face 23 of the plug 19 is one end of a metal double bellows unit 24, constituting a sealing member, the unit comprising concentric inner and outer bellows members 26 and 25. The inner ends of the bellows member remote from the plug 19 are attached to an end plate 27 of substantial thickness, which closes off the space 31 within the inner bellows member 26. The bellows unit extends into the bore 11 of the conduit 10, with the outer bellows a sliding fit in the bore when the bellows unit is at atmospheric pressure. An annular bellows chamber 28, formed between the inner and outer bellows members, is partially filled with a liquid, with the remaining space occupied by a gas or vapour. The type of liquid and the quantity of liquid will be chosen for compatibility with the environmental condition prevailing in the main system.

A screw-jack 29 which registers in a threaded coaxial bore 30 provided in the plug 19 extends axially into the space 31 within the inner bellows member 26. The jack, which is operated exteriorly of the plug 19 by a handwheel 32, terminates in a swivel-end 33 which can engage the bellows end plate 27. To prevent back-pressure bulding up in the space 31 due to change in bellows length, a vent 34 to atmosphere is provided in the plug 19.

In operation of the device, when the jack 29 is withdrawn into the position shown in FIGURE 3, fluid in the conduit 10 at an elevated pressure will compress the bellows unit axially; the liquid therein, being incompressible and remaining substantially at constant volume, will compress the vapour or gas above it to a point where the pressures are stabilized. The outer bellows member will be caused to expand radially under the pressure, and the crests of the convolutions of he bellows will engage the wall of the conduit thereby creating a series or labyrinth of discrete seals. If the strain in the metal of the bellows unit is not taken beyond the elastic limit of the material, the bellows will return to its original size upon removal of external pressure on the bellows.

A system employing a closure of the type described may have either pressure released means for else valve means for isolating the closure plug if the system is to remain pressurized. The latter arrangement would also require pressure release means between the isolating valve and the closure plug. Assuming then that the pressure fluid in the conduit 10 is released and excess fluid can escape therefrom, the bellows unit will be urged into its "free" condition by the pressure of its internal vapour or gaseous atmosphere. In order to release the bellows unit positively from sealing engagement with the wall of the conduit 10, the screw-jack 29 is operated to urge the end plate 27 away from the end plate 19 and thus extend the bellows axially to disengage the crests from the wall. A counterclockwise turn of the plug 19 to align the lugs 21 with the slots 16 will enable the plug 19 and the bellows unit 24 to be withdrawn and replaced at will.

In this specification the term "conduit" means any pipe or tubuar structure for containing fluid under-pressure, and includes a pressure vessel having a tubular neck portion terminating in an opening to which the sealing means described can be applied.

It will be appreciated that the preferred embodiment herein described is mainly illustrative of the operation of a seal of this type. There are many applications in which a seal constructed in accordance with the teachings of the invention may be used. It is also envisaged that other presently known bellows profiles may be used with equal efficacy.

What I claim as my invention is:

1. Releasable sealing means for the end of a conduit carrying fluid under pressure, comprising a closure plug for releasable interlocking engagement with the end of the conduit, a double bellows unit comprising concentric inner and outer bellows members defining a closed annular chamber, an incompressible fluid partially filling the annular chamber, one end of the bellows unit being attached to the inner face of the plug and the bellows unit being arranged to extend into the bore of the conduit, an end plate attached to and closing the other end of the bellows unit, the bellows unit being compressible axially by fluid pressure within the conduit so as to expand radially into sealing engagement with the wall of the conduit, and means operable exteriorly of the plug for expanding the bellows unit axially against the fluid pressure whereby to disengage the bellows from the wall of the conduit.

2. Releasable sealing means according to claim 1, wherein the means for expanding the bellows unit axially against the fluid pressure comprises a jack-screw extending through the closure plug, the jack-screw extending axially within the inner bellows member and terminating in a swivel-end engaging the end plate.

3. Releasable sealing means according to claim 1, wherein the closure plug includes a vent for venting the space within the inner bellows member to atmosphere.

4. In combination with a conduit containing fluid under pressure, the conduit terminating in a circular end opening having a radial flange and a conical seat, releasable sealing means according to claim 1, wherein the closure plug is adapted to cooperate with the radial flange and be retained thereby, the plug having a conical face cooperating with and seating against said conical seat of the conduit.

References Cited

UNITED STATES PATENTS

| 2,870,794 | 1/1959 | Thaxton | 138—90 |
| 2,921,608 | 1/1960 | Crawford et al. | 138—89 |

FOREIGN PATENTS

| 577,310 | 6/1959 | Canada. |
| 4,719 | 1896 | Great Britain. |
| 19,943 | 1893 | Great Britain. |
| 580,318 | 9/1946 | Great Britain. |
| 904,274 | 8/1962 | Great Britain. |

ROBERT R. MACKEY, *Primary Examiner.*